F. CONRAD.
OVERLOAD AND REVERSE CURRENT RELAY.
APPLICATION FILED MAY 22, 1909.

1,137,840.

Patented May 4, 1915.
2 SHEETS—SHEET 1.

WITNESSES:
C. L. Belcher
Otto S. Schairer

INVENTOR
Frank Conrad
BY
Wesley G. Carr
ATTORNEY

F. CONRAD.
OVERLOAD AND REVERSE CURRENT RELAY.
APPLICATION FILED MAY 22, 1909.

1,137,840.

Patented May 4, 1915.
2 SHEETS—SHEET 2.

WITNESSES:
C. L. Belcher
Otto S. Schairer.

INVENTOR
Frank Conrad
BY
Wesley G. Carr
ATTORNEY

UNITED STATES PATENT OFFICE.

FRANK CONRAD, OF SWISSVALE, PENNSYLVANIA, ASSIGNOR TO WESTINGHOUSE ELECTRIC AND MANUFACTURING COMPANY, A CORPORATION OF PENNSYLVANIA.

OVERLOAD AND REVERSE CURRENT RELAY.

1,137,840.

Specification of Letters Patent. Patented May 4, 1915.

Application filed May 22, 1909. Serial No. 497,799.

*To all whom it may concern:*

Be it known that I, FRANK CONRAD, a citizen of the United States, and a resident of Swissvale, in the county of Allegheny and State of Pennsylvania, have invented a new and useful Improvement in Overload and Reverse Current Relays, of which the following is a specification.

My invention relates to relay devices, and particularly to such devices as are adapted to protect electrical circuits from injuries resulting from overloads or from reversals of the direction of current flow therein.

The object of my invention is to so construct and arrange the parts of an instrument of the character indicated that the movable member thereof may be caused to move at a substantially uniform rate when the initial actuating force exceeds a predetermined value and during the continuance of the abnormal circuit conditions.

Figure 1:
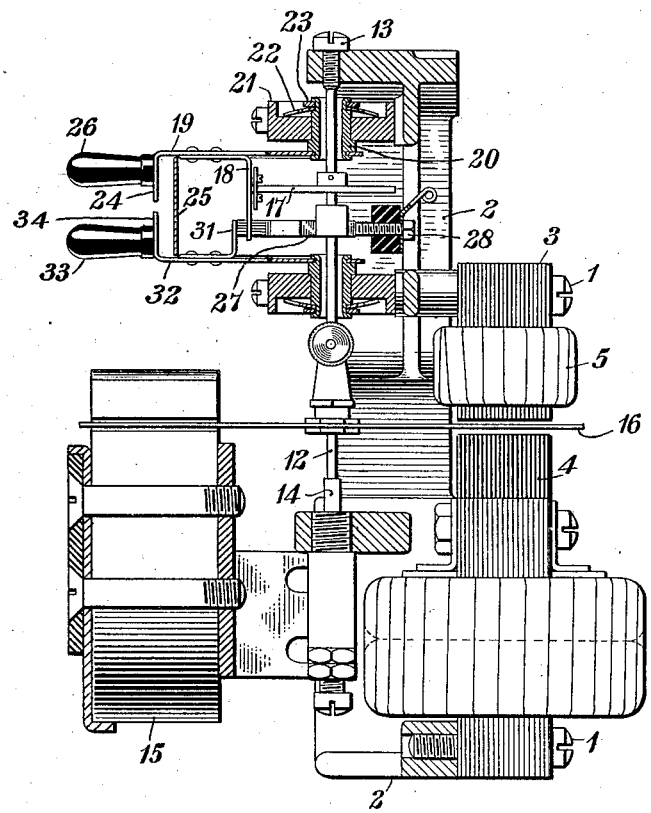
Figure 2:
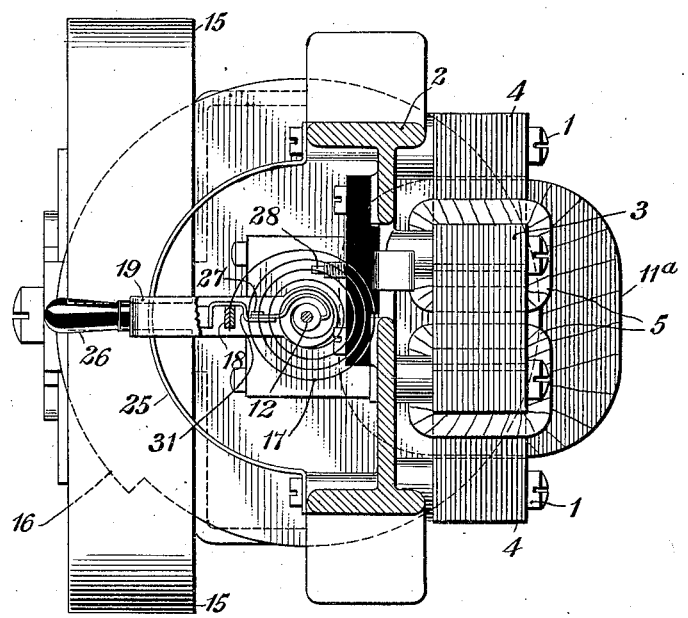
Figure 3:
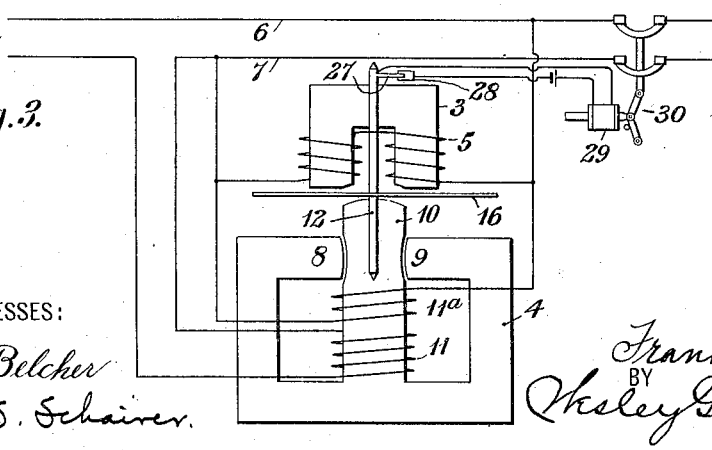

Figure 1 of the accompanying drawings is a view, in side elevation and in section, of an instrument embodying the invention. Fig. 2 is a plan view of the instrument of Fig. 1, some of the parts being shown in section for the sake of clearness of illustration, and Fig. 3 is a diagrammatic view illustrating the circuit connections of the instrument.

Secured, by means of screws 1, to the main frame 2 of the device, is a two-part laminated magnetizable core 3—4, the part 3 of which is of U-shape and is provided with a winding 5 the respective terminals of which are connected to conductors 6 and 7 of the circuit to be protected. The part 4 comprises two alined polar projections 8 and 9 having opposing faces and a main polar projection 10 which differs in polarity therefrom and extends between and somewhat beyond the said opposing faces, from which it is separated by suitable air gaps. The main polar projection 10 is surrounded by a coil 11 that is connected in series with one of the conductors of the circuit 6—7, or is otherwise arranged so as to be supplied with current which is proportional, in amount, to that traversing the said circuit, and also by a coil 11ª that is connected between the terminals of the winding 5 on the core part 3, so that the currents induced therein may be supplied to the said winding.

Mounted upon a shaft 12 having, at its ends, bearings 13 and 14 that are supported by the frame 2, and arranged to rotate between the opposing faces of the polar projections of the core 3—4, and also between the polar faces of permanent magnets 15, by which its movements are retarded, is a conducting disk 16 the movements of which and of the shaft 12 are opposed by a spiral spring 17 the inner end of which is secured to a hub on the shaft 12. The outer end of the spring 17 is secured to a downwardly extending projection 18 carried by an arm 19 the inner end of which is secured to a bushing 20 that surrounds the upper end of the shaft 12 and is rotatable within a supporting block or member 21 therefor that is secured to the frame 2.

Secured upon the upper end of the bushing 20, and located within a recess in the upper face of the member 21, is a spring washer 22 that serves to introduce a sufficient degree of friction between the relatively movable parts to retain the arm 19 in any position to which it may be adjusted, irrespective of the torque exerted by the spring 17, the spring washer 22 being secured in position by means of another washer 23 and an upset portion of the bushing 20.

The arm 19 is provided, at its outer free end, with a downwardly extending index portion 24 that coöperates with a cylindrically curved scale 25 the divisions of which represent suitable units, such as current values, the arrangement being such that when the index 24 occupies a position opposite the zero point of the scale the spring 17 opposes no force to the initial movement of the shaft 12 and the disk 16. A handle 26 is provided for operating the movable arm 19 to adjust the torque exerted by the spring upon the shaft 12.

The shaft 12 carries a movable contact terminal 27 that is adapted to be moved into engagement with a stationary contact terminal 28 when there is an overload upon the circuit 6—7, or when current traverses the said circuit in the reverse of normal direction, engagement of the contact terminals 27 and 28 serving to establish the circuit of a tripping magnet winding 29 of a circuit breaker 30 whereby the circuit 6—7 is interrupted. If the arm 19 is so adjusted that the spring 17 exerts a torque upon the shaft 12, the movable contact terminal 27 will be maintained in engagement with a stop 31 which is carried by an arm 32 that is mounted similarly to the arm 19 and is provided with an operating handle 33 and an index portion 34 that also coöperates with the scale 25.

It will be understood that the period during which abnormal circuit conditions will exist in the circuit 6—7, before engagement of the contact terminals 27 and 28 occurs, will depend upon the distance between the said terminals, the positions of the stop 31 and the arm 32 determining the said distance. In order to prevent movement of the arm 31, in a clockwise direction, beyond the position of the arm 19, the projection 18 is extended into the path of movement of the stop 31.

While the specific form of the device herein set forth is different from that set forth in applicant's co-pending application Serial No. 259,388, filed May 8, 1905, the arrangement of the core parts and of the winding and their connections is such as to insure a similar mode of operation and an equivalent result.

The current traversing the winding 11 produces a flux in the polar projection 10 of the core, which, in turn, induces, in the coil 11ª, a current that is supplied to the winding 5 upon the core part 3. These currents in the windings 5 and 11 cause a torque to be exerted upon the disk 16 that is proportional to the square of the current traversing the coil 11, as well as that traversing the circuit 6—7, this being an ammeter torque. The winding 5, being also connected between conductors 6 and 7, is traversed by a current that is proportional to the electromotive force of the said circuit, with the result that another torque is exerted upon the disk 16 that is proportional to the product of the current, voltage and power factor of the circuit 6—7, this being a wattmeter torque. The arrangement is such that the ammeter and wattmeter torques oppose each other, and also such that the ammeter torque acts in opposition to that of the spring 17. If the ammeter torque becomes sufficient to overcome that exerted by the spring 17, a rotative movement of the shaft 12 and of the contact terminal 27 will occur, with the result that the switch member 27 will be finally brought into engagement with the stationary contact terminal 28, thereby establishing the circuit of the tripping magnet 29 of the circuit-breaker and causing interruption of the circuit 6—7.

It will be understood that the above-specified condition will occur when a current amounting to an overload traverses the circuit 6—7. The degree of overload that will cause tripping of the circuit-breakers depends upon the position of the arm 19, which may be adjusted, and of the consequent degree of torque exerted upon the shaft 12 by the spring 17. The period during which the overload must continue in order to cause interruption of the circuit is dependent upon the position of the arm 31, and the consequent distance between the switch contacts 27 and 28. If, for any reason, the current in the circuit 6—7 becomes reversed in direction, the wattmeter torque will become reversed and will then assist or supplement the ammeter torque, the algebraic sum of which will be exerted upon the disk 16 to cause rotative movement thereof and engagement of the switch contacts 27 and 28, provided the said abnormal condition continues for a sufficient period of time. In order that, with a given amount of overload upon the circuit 6—7, or with a given value of current traversing the same in the reverse of normal direction, the disk 16 and shaft 12 may be caused to rotate at a uniform speed and may continue to rotate until contact terminals 27 and 28 are caused to engage, irrespective of the increasing torque exerted by the spring 17, the disk 16 is provided with a spiral contour and is so arranged that an increasing area thereof is presented adjacent the polar faces of the core parts 3 and 4 as it is rotated from its initial toward its final position, the torque exerted electromagnetically upon the disk being thereby caused to increase at substantially the same rate as the torque exerted by the spring 17 increases.

The present arrangement differs from that heretofore commonly employed in measuring instruments of the indicating type in that the disk will be caused to move at a uniform rate from its initial to its final position when the instrument windings are traversed by constant amounts of current, whereas, in previously constructed instruments, the deflection of the disk has been in proportion to the square of the amount of current traversing the instrument winding, and the rate of movement of the disk is not uniform. By reason of the uniformity of the rate of movement of the disk, the time required for the disk to move from any predetermined initial position to its final position, may be accurately determined and the scale of the instrument may be calibrated with divisions of equal length corresponding to suitable periods of time.

I claim as my invention:

1. A relay instrument comprising a magnet, a disk having a spiral contour and mounted for rotative movement to present an increasing area adjacent a polar face of the magnet as it moves from its initial position, and an opposing spring the torque of which varies at substantially the same rate as the electromagnetic torque which it opposes.

2. A relay instrument comprising a magnet, a disk having a spiral contour and mounted for rotative movement to present a portion of increasing radius adjacent a polar face of the magnet as it moves from its initial position, and means for restraining the disk and holding it in its initial positon until a predetermined opposing value of magnetizing current is reached, and then further progressively increasing the restraining force on the disk in proportion to the increase in the opposing torque caused by the rotation of the spiral disk.

3. A relay instrument comprising a magnet, a disk having a spiral contour and mounted for rotative movement to present an increasing area adjacent a polar face of the magnet as it is rotated from a predetermined position, and means for restraining the disk producing a restraining force increasing progressively in proportion to the increase in torque caused by the progressive increase of the effective area of the disk.

4. A relay instrument comprising a magnet, a disk having a spiral contour and mounted for rotative movement to present an increasing area adjacent a polar face of the magnet as it is rotated from a predetermined position, and a resilient means for exerting an opposing torque that varies as the electromagnetic torque exerted upon the disk varies.

5. A relay instrument comprising a magnet, a disk having a spiral contour and mounted for rotative movement, and a resilient means for opposing movement of the disk, the disk radii being of such progressively greater lengths that the electro-magnetic torque exerted upon the disk will increase at substantially the same rate as that exerted by the said resilient opposing means.

In testimony whereof, I have hereunto subscribed my name this 19th day of May, 1909.

FRANK CONRAD.

Witnesses:
C. AOLBARY,
B. B. HINES.

Copies of this patent may be obtained for five cents each, by addressing the "Commissioner of Patents, Washington, D. C."